May 22, 1934. B. D. SAKLATWALLA ET AL 1,959,765
PROCESS OF HYDROLIZING TITANIFEROUS SOLUTIONS
Filed Nov. 29, 1932
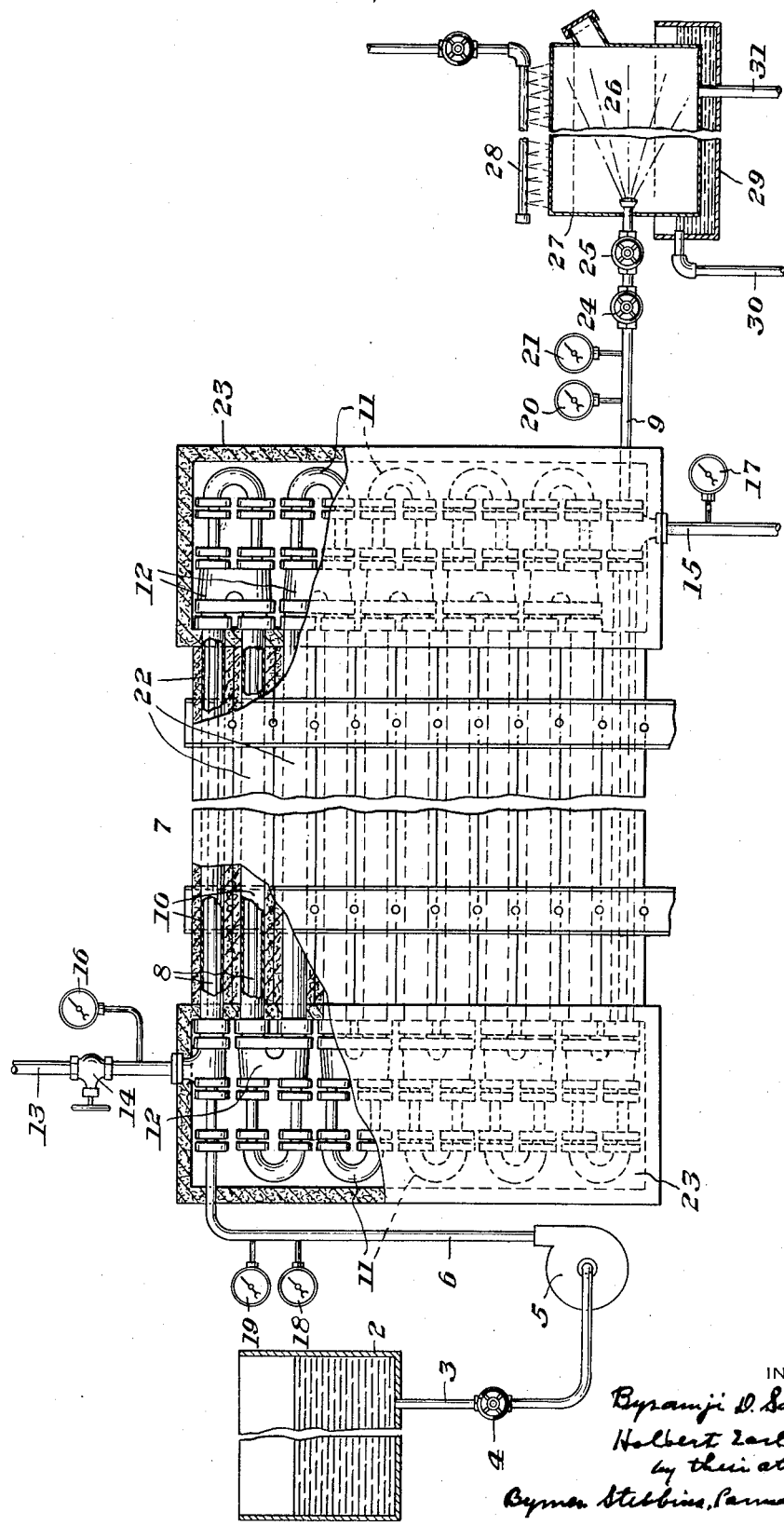
INVENTORS
Byramji D. Saklatwalla
Holbert Earl Dunn
by their attorneys
Byrnes, Stebbins, Parmelee & Blenko.

Patented May 22, 1934

1,959,765

UNITED STATES PATENT OFFICE 1,959,765

PROCESS OF HYDROLYZING TITANIFEROUS SOLUTIONS

Byramji D. Saklatwalla and Holbert Earl Dunn, Crafton, Pa., assignors to Southern Mineral Products Corporation, New York, N. Y., a corporation of Delaware Application November 29, 1932, Serial No. 644,834

19 Claims. (Cl. 23—202)

The present invention relates to a process of hydrolyzing titaniferous solutions, and more especially to the continuous hydrolysis of dilute solutions containing titanium sulphate to cause the hydrolytic precipitation of so-called basic titanic sulphate, which may be converted by calcination into titanium dioxide.

In the usual sulphuric acid process of making titanium dioxide from titaniferous ores, such as ilmenite, the ore is ground and mixed with strong sulphuric acid, the mixture is heated, and a reaction occurs in which the titanium and iron contents of the ore are converted into titanium and iron sulphates. The sulphated ore is then leached with water to extract the soluble titanium and iron sulphates, forming what is known as a strong liquor. The strong liquor also contains other metallic impurities which have been rendered soluble by the sulphuric acid, such as compounds of vanadium, chromium, nickel, copper, manganese, and various other metals which may be present in the ore. This solution is then generally treated with metallic iron to convert ferric sulphate into ferrous sulphate. Sometimes a part of the ferrous sulphate is then removed by crystallization. The strong liquor containing the titanium sulphate, together with some ferrous sulphate and various soluble metallic impurities, is then usually diluted and heated so as to hydrolyze the titanium sulphate and produce the precipitate which is variously referred to as basic titanic sulphate, hydrated titanic sulphate, meta-titanic acid, hydrated titanic acid, titanium dioxide, etc. This precipitate is a complex mixture which may contain varying proportions of titanic acid and basic titanium sulphates. For convenience, we use the term "basic titanic sulphate" to designate this complex precipitate. The precipitate is then dried, calcined, ground and used for various purposes, such as for pigments.

It has been customary to carry out the hydrolysis of the titanium sulphate solution by the batch method in which a charge of the diluted titanium sulphate solution was run into a heating vessel, where it was heated to the temperature required to effect hydrolysis. Because of the inherent limitations of such batch process the entire mass was brought up to hydrolyzing temperature relatively slowly. Moreover, the heating could not occur uniformly throughout the volume of the material, since those parts of the solution which were in contact with the heating surfaces or the steam injected for heating purposes, were heated before the rest of the solution, causing localized heating with uneven hydrolysis throughout the volume of the solution. The batch process was also subject to the disturbing influence of dilution caused by live steam injection when used, or where immersed steam coils or jackets were employed, evaporation losses caused uneven dilution even if correction were attempted by water additions. Attempts were made to correct these difficulties by using stirrers, but stirring could not entirely overcome localized heating and had comparatively little effect upon the relatively slow rate of heating up the whole mass of the solution.

In the batch process, after the desired degree of hydrolysis had been attained, the solution was pumped from the hydrolyzing receptacle. These receptacles frequently had capacities of 2000 gallons or over, and consequently required an appreciable time to empty, often in the neighborhood of fifteen to twenty minutes. After the desired degree of hydrolysis is attained, it is undesirable to longer continue the heating because of the tendency of the precipitate to redissolve, and in the process of redissolving, incipient solution sets in, giving a peptized flocculent condition to the basic titanic sulphate which deleteriously affects the physical properties of the basic titanic sulphate, particularly when used for pigments. In the batch process, therefore, the time required for emptying the hydrolyzer after the desired degree of hydrolysis had been attained, gave an opportunity for such deleterious action to occur. Attempts to remedy this evil, by starting the discharge of the hydrolyzing vessel before complete hydrolysis had occurred, resulted in loss of yield.

In order to secure the optimum hydrolyzing conditions, the solution should be very quickly raised to the proper hydrolyzing temperature, maintained at this temperature for the exact period of time necessary for the completion of the desired degree of hydrolysis and no longer, and then very rapidly cooled to check further reaction. We have found that these optimum conditions can be attained by passing the solution to be hydrolyzed continuously through a long hydrolyzing tube in which each increment of the solution as it enters the tube is very rapidly brought to proper hydrolyzing temperature, and in which the proper hydrolyzing temperature can be accurately maintained during the flow of the solution through the tube, and from which the solution can be discharged and immediately cooled to stop further reactions. The carefully controlled optimum conditions made possible by such system of continuous hydrolysis, results in a product superior to that attained by the batch process. The continuous method also effects considerable economy in handling and hydrolyzing the solution over the batch process. The cost of the equipment is less, particularly since standard pipe and fittings may be employed for the hydrolyzer, as contrasted with the large vessels required for the batch process. Moreover, the apparatus for the continuous process is better adapted for accurate regulation and adjustment.

The accompanying drawing is a diagrammatic view of the preferred form of apparatus used for carrying out our process.

The dilute aqueous solution of titanium sulphate which is to be hydrolyzed is supplied from a stock tank 2 in which the solution is stored at room temperature. The solution flows through a pipe 3 provided with a shut-off valve 4 to a pump 5 which delivers the solution under pressure through the pipe 6 to the continuous hydrolyzer, which is indicated generally by reference numeral 7. The hydrolyzer is of the parallel flow double pipe type of heat exchanger. It consists of an inner pipe or tube 8 through which the solution flows, and from which it is discharged through an outlet pipe 9. An outer tube or pipe 10 forms a steam heating jacket around the inner tube. For sake of compactness the hydrolyzer is made up of a number of sections connected by return bend connections, as indicated, the return bends of the inner tube being indicated at 11 and the return bends of the steam jacket being indicated at 12. The hydrolyzer may be of any convenient length, and in the drawing is shown as broken in the middle to indicate an indefinite length. Any convenient number of sections can be built up depending upon the length of the sections and the total length of the hydrolyzer tube desired. In the drawing, which is largely diagrammatic, the hydrolyzer is shown on a somewhat exaggerated size as compared with the other parts of the apparatus, in order to better illustrate the construction of the hydrolyzer.

As above stated, the hydrolyzer is of the parallel flow type of heat exchanger, the steam inlet and solution inlet being at the same end of the hydrolyzer. Steam under pressure is supplied through a supply pipe 13 provided with a shut-off valve 14 to the steam jacket 10 through which it flows to the steam discharge pipe 15. Steam pressure gauges 16 and 17 are provided at the steam inlet and outlet, respectively, for observation to control the pressure and consequently the temperature of the steam.

The pipe 6 which supplies the solution to the hydrolyzer is provided with a thermometer 18 and pressure gauge 19. A thermometer 20 and pressure gauge 21 are connected with the solution outlet pipe 9.

The hydrolyzer may be of any convenient length depending primarily upon the velocity of flow, in order to secure the proper time of retention of the solution in the hydrolyzer. The velocity flow should be sufficient to secure efficient heat transfer to the solution from the walls of the tube, as well as being sufficient to carry along the basic titanic sulphate precipitate which is formed during the hydrolysis. In commercial practice the hydrolyzer may conveniently be made of a total tube length of about 1000 to 1500 feet.

The solution-carrying hydrolyzer tube 8 may be of any suitable heat-conducting acid-resistant type. For economy in manufacture a standard one and one-quarter inch inside diameter steel pipe lead-lined to one inch inside diameter has been employed. The steam jacket 10 was formed from a two and one-half inch inside diameter standard steel pipe.

The hydrolyzer is preferably heat-insulated. For convenience of assembly and of access for repairs, the straight lengths of the steam jacket are covered with ordinary magnesia insulating pipe coverings 22, while the return bend connections at each end of the hydrolyzer are enclosed in an insulating casing 23 which may be opened for inspection and repair.

The solution is led from the hydrolyzer through the outlet pipe 9 which is provided with a shut-off valve 24 and throttle valve 25. The hydrolyzed solution is discharged through the throttle valve into a flash cooler 26. The flash cooler consists of a thin-walled sheet steel lead-lined vessel 27 which is bathed on the outside with a spray of cold water from spray pipe 28, the water being collected and drained away by a collector pan 29 and drain pipe 30. The cooled hydrolyzed slurry is discharged from the flash cooler through a discharge pipe 31 to the usual filters which separate the precipitated basic titanic sulphate from the filtrate.

The operation of the apparatus is as follows:—

The dilute aqueous solution of titanium sulphate which is to be hydrolyzed is supplied at room temperature and at a pressure of about 35 to 45 pounds per square inch to the inlet end of the hydrolyzer. The steam at a pressure of about 35 to 45 pounds per square inch is supplied through the steam inlet at the same end of the hydrolyzer. The solution to be hydrolyzed and the steam have a parallel flow through the hydrolyzer. The parallel flow is of advantage in that it provides for the maximum heat transfer at the inlet end of the hydrolyzer so as to heat the titanium sulphate solution as quickly as possible. After the solution is brought up to the hydrolyzing temperature it is maintained at this temperature as it flows throughout the length of the hydrolyzer. In order to secure the best product, the solution should be brought as quickly as possible to the hydrolyzing temperature. The continuous process as carried out in the type of apparatus illustrated accomplishes this since each small incremental volume of the solution as it flows into the hydrolyzer is immediately subjected to the maximum heating effect of the steam and is very quickly brought to the proper hydrolyzing temperature. The velocity flow of the solution and steam through the hydrolyzer conduces to rapid heat transfer through the tube walls.

The solution as delivered to the hydrolyzer may be at ordinary room temperature. The temperature of the solution as discharged from the hydrolyzer is about 255 to 265° F. This temperature is attained by the solution shortly after it enters the hydrolyzer and is maintained throughout the remainder of its travel. We have found that ordinarily the hydrolysis has begun and is well under way within the first 10% of the length of the hydrolyzer. The hydrolysis thereafter continues as the solution travels through the remainder of the hydrolyzer. The rate of flow and consequent time of retention of the solution in the hydrolyzer is controlled by the throttle valve 25. The time of retention is preferably regulated so that about 85 to 90% of the total titanium dioxide content of the solution is hydrolyzed and precipitated in the hydrolyzer. The percentage recovery is regulated to give the maximum recovery consistent with high quality of the product. In the type of apparatus described the time of retention in the hydrolyzer is in the neighborhood of one-half hour, that is, it takes about one-half hour for a given part of the solution to travel through the hydrolyzer.

After the desired degree of hydrolysis has been attained, the solution containing the precipitated basic titanic sulphate is immediately cooled by passing through the throttle valve 25 into the flash cooler 26. The cooling immediately checks any further reactions and prevents the undesirable reversal of the reaction, which would result in re-solution of the precipitate with the formation of colloidal matter if the solution were slowly cooled.

The cooled slurry from the flash cooler is periodically sampled as a control on the process. The cooled slurry passes to the filters which may be of the usual type and in which the precipitate is removed from the filtrate and washed in the usual way. The precipitate from the filters is then dried and calcined in the usual manner.

As will be apparent from the foregoing description, an accurate control of the optimum conditions for hydrolysis is secured in our process. The solution to be hydrolyzed is quickly brought to the best hydrolizing temperature, which is accurately controlled during th. entire hydrolyzing operation. This hydrolyzing temperature is accurately maintained for a length of time to secure the exact degree of hydrolysis consistent with good yield and the best quality of the product. Then the hydrolysis is immediately checked and the solution quickly cooled to stop further reactions.

Each increment of the solution as it enters and passes through the hydrolyzer is subjected to exactly the same conditions of temperature and time of flow, so that the hydrolysis takes place uniformly throughout the entire body of the material, without the disturbing effects of localized temperature inequalities and dilutions encountered in the batch process. Because of such accurately controlled conditions the time of hydrolysis can be considerably shortened over that of the batch process. The tube type of hydrolyzer is relatively inexpensive to operate as compared with the hydrolyzers employed in the batch process, and the expense of maintaining the tube type of hydrolyzer is also less than the maintenance cost of batch process hydrolyzers, particularly the autoclaves used in the batch process.

More important, perhaps, than the speed and economy of the process, is the quality of the product made possible by this process. The optimum conditions of quick heating, maintaining at the desired temperature for an exact period of time, and quick cooling, combined with the accurately maintained control of these conditions, which can be continually checked by sampling, make possible the production of a titanium dioxide of great tinting strength or hiding power, which is the prime desirable quality for pigment use. We have found that the titanium dioxide can be continuously commercially produced by our process having a considerably higher average tinting strength than that produced by the usual commercial batch processes.

Our continuous hydrolyzing process is applicable to various types of aqueous solutions containing titanium sulphate. While a solution which is substantially neutral or of but slight acidity may be hydrolyzed in our apparatus with advantage, as compared with batch apparatus, we prefer to use a titanium sulphate solution which is pre-acidified with some excess of free sulphuric acid as the solution to be hydrolyzed.

Tests which we have made in the batch process indicate that if a dilute solution of titanium sulphate which is either substantially neutral or of but slight acidity, is heated, hydrolysis does not begin until a temperature is reached of about 185 to 190° F. When this temperature is reached, a very rapid hydrolysis takes place throughout the volume of the solution, forming an initial precipitate of basic titanic sulphate which may amount to 20 to 30% of the total titanium dioxide content of the solution. This initially rapidly precipitated basic titanic sulphate appears to be of relatively large particle size and is contaminated with more metallic impurities than the major portion of the basic titanic sulphate which is later precipitated at a slower and more normal rate. After the rapid initial hydrolysis has taken place, hydrolysis proceeds at a slower rate upon further heating until the desired percentage of the titanium sulphate content is hydrolyzed and precipitated. The basic titanic sulphate which is thus precipitated at the slower and more normal rate appears to be of finer particle size and is less contaminated with metallic impurities. The hydrolysis of the titanium sulphate solution results in the release of free sulphuric acid. We believe that the initial rapid undesirable hydrolytic precipitation is checked by the free acid which it produces, and that thereafter in the presence of the free acid thus produced, the hydrolysis is slowed down so as to give the desirable rate of hydrolytic precipitation characteristic of the second stage of the process.

As described in our copending application, Serial No. 644,835, filed November 29, 1932, we have found that the undesirable initial rapid precipitation characteristic of the first hydrolysis step above indicated can be suppressed, and the entire hydrolyzing operation carried out at the slower rate characteristic of the second hydrolyzing step above mentioned, if the dilute titanium sulphate solution is pre-acidified with a sufficient excess of free sulphuric acid to cause the hydrolysis to proceed from the start at the slower rate. As set forth in our application above referred to, we have found that in carrying out the batch process the solution should be pre-acidified with at least 6% excess sulphuric acid, preferably about 10% excess sulphuric acid, in order to obviate the undesirable initial too rapid precipitation and to obtain improved color and tinting strength.

In the continuous process, which is the subject-matter of our present application, we have found that a similar phenomenon occurs if a substantially neutral dilute solution of titanium sulphate is passed through the continuous tube type of hydrolyzer, namely, that immediately upon heating the solution to the hydrolysis temperature, there is a tendency for an initial very rapid hydrolysis to take place, producing a precipitate of undesirably large particle size. We have found that this can be checked by pre-acidifying the solu'ion with an excess of sulphuric acid. We have found, however, that, probably due to the extremely rapid heating and the carefully controlled temperature conditions maintained in our continuous process, the excess acid required to prevent the undesirable initial rapid hydrolysis can be less than that required in the batch process referred to in our copending application. Our tests so far indicate a substantial reduction in the amount of free acid required. For example, in our continuous process an excess of about 6% free acid seems to have substantially the same effect as an excess of 10% free acid in the batch process referred to in our said copending application. In our continuous process we prefer to use about 5 to 10 or 15% free acid, but our tests indicate that the amount of excess acid may be reduced to about 3 or 4% and still attain very substantial advantages in the prevention of too rapid initial hydrolysis, the maintenance of the uniform rate of hydrolysis, and the securing of a product of exceptionally high tinting strength.

By the term "free acid" we mean sulphuric acid over and above that required to combine with the titanium dioxide content of the solution to form normal titanic sulphate plus that required to combine with the iron to form ferrous sulphate.

The excess free acid in addition to giving us a better control of particle size with consequently better tinting strength in our continuous process, also tends to improve the color by preventing the precipitate from being contaminated by metallic impurities if present.

In our continuous process we are enabled to use solutions of somewhat greater titanium dioxide content than in the batch process hydrolytic precipitations of solutions of the same character. This is apparently due to better hydrolyzing conditions and more accurate control, whereby we can secure a readily filterable precipitate utilizing a higher initial titanium dioxide content in the titanium sulphate solution than is the case with the usual batch process above mentioned. We have found that we can use a titanium sulphate solution resulting from the sulphatizing and leaching of raw ilmenite ore and diluted to about 4% or over total titanium dioxide content with satisfactory results and obtain a precipitate which is readily filterable with the ordinary commercial type vacuum filters, whereas the same type of titanium sulphate solution required dilution to less than 3% total titanium dioxide content to obtain a readily filterable precipitate by batch hydrolysis.

While we have described our process with particular reference to the hydrolysis of solutions of titanium sulphate to produce titanic basic sulphate suitable for the manufacture of titanium dioxide, our continuous hydrolysis process can be applied to other titanium solutions and for the manufacture of other titaniferous products. The process is particularly applicable to the continuous hydrolytic production of the so-called composite pigments in which the basic titanic sulphate is precipitated upon and coalesced with particles of an extender such as calcium sulphate are barium sulphate. For example, in the making of a composite or extended pigment containing titanium dioxide and calcium sulphate; milk of lime, calcium chloride or finely divided calcium sulphate may be added to the titanium sulphate solution in the stock tank and the solution then passed through the hydrolyzer in which the hydrolytic precipitation of basic titanic sulphate takes place, with a coalescence of the particles of the basic titanic sulphate upon the particles of calcium sulphate. In the case of making the barium base extended titanium dioxide pigments, barium hydrate or barium chloride, or precipitated barium sulphate such as blanc fixe, may be added to the titanium sulphate solution in the stock tank and the solution passed through the hydrolyzer with the consequent precipitation and coalescence of the basic titanic sulphate upon the barium sulphate particles. Such extended pigments are usually sold upon the basis of their tinting strength or hiding power and this has usually been calculated upon the basis of the titanium dioxide content. In our continuous process the particle size of the basic titanic sulphate particles as coalesced upon the particles of calcium sulphate or barium sulphate, can be controlled so as to give a maximum tinting strength or hiding power, and, consequently, extended pigments of these types can be produced having greater tinting strength and hiding power in proportion to the amount of titanium dioxide as shown by their analyses. In other words, it is possible to maintain the same tinting strength or hiding power and reduce the amount of more expensive titanium dioxide present in the extended pigment.

Our continuous hydrolysis may be applied to other titaniferous solutions, such, for example, as the hydrolysis of a solution containing titanium sulphate and phosphoric acid. The hydrolysis of such solution produces a titanium phosphate which is useful as a pigment. The conditions of hydrolysis as above described produce a hydrolyzed titanium phosphate precipitate of good physical characteristics for pigment manufacture.

While we have specifically described the preferred form of apparatus for carrying out our process, and the best procedure now known to us in practicing our invention, it is understood that the invention is not limited to the use of the type of apparatus illustrated or to the preferred procedure above described, but may be otherwise embodied and practiced within the scope of the following claims.

We claim:

1. The process of hydrolyzing titaniferous solutions, which comprises quickly heating under pressure a continuously flowing stream of the solution to the hydrolyzing temperature, maintaining the stream under pressure at such temperature for the time required to effect the desired degree of hydrolysis, and then releasing the pressure on the stream and quickly cooling it.

2. The process of hydrolyzing titaniferous solutions, which comprises quickly heating under pressure to the hydrolyzing temperature a continuously flowing stream of a solution containing titanium sulphate and a sufficient excess of free sulphuric acid to prevent the undesirably rapid initial precipitation of basic titanic sulphate which would occur if such excess free acid were not present in the solution, maintaining the stream under pressure at such temperature for the time required to complete the hydrolysis to the desired extent, and then releasing the pressure on the stream and quickly cooling it.

3. The process of hydrolyzing titaniferous solutions, which comprises quickly heating a continuously flowing stream of the solution to the hydrolyzing temperature, maintaining the stream at such temperature for the time required to effect the desired degree of hydrolysis, and then quickly cooling it.

4. The process of hydrolyzing titaniferous solutions, which comprises heating under pressure a continuously flowing stream of the solution to the hydrolyzing temperature, maintaining the stream under pressure at such temperature for the time required to effect the desire degree of hydrolysis, and then releasing the pressure on the stream and quickly cooling it.

5. The process of hydrolyzing titaniferous solutions, which comprises heating a continuously flowing stream of the solution to the hydrolyzing temperature, maintaining the stream at such temperature for the time required to effect the desired degree of hydrolysis, and then cooling it.

6. The process of hydrolyzing titaniferous solutions, which comprises passing a stream of the solution continuously and under pressure through a tube of such length that a sufficient velocity is attained to secure efficient heat transfer from the tube walls and to carry along the hydrolyzed precipitate with the solution, rapidly heating the stream as it flows along the tube to the hydrolyzing temperature and maintaining it at such temperature until the desired degree of hydrolysis has been attained, and then immediately discharging the stream from the tube into a flash cooler.

7. The process of hydrolyzing titaniferous solutions, which comprises passing a stream of the solution continuously through a tube of such length that a sufficient velocity is attained to secure efficient heat transfer from the tube walls and to carry along the hydrolyzed precipitate with the solution, heating the stream flowing through the tube to the hydrolyzing temperature and maintaining it at such temperature until the desired degree of hydrolysis has been attained, and then immediately cooling the stream.

8. The process of hydrolyzing titaniferous solutions, which comprises passing a stream of the solution through a tube type heater in which the solution is rapidly heated to the hydrolyzing temperature and maintained at such temperature for a predetermined time to effect the desired degree of hydrolysis, and then immediately discharging the solution from the heater and cooling it.

9. The process of hydrolyzing titaniferous solutions, which comprises passing a stream of the solution through a heat exchanger of the parallel flow type in which the solution is quickly heated under pressure to the hydrolyzing temperature and maintained at such temperature until the desired degree of hydrolysis is attained, and then discharging the stream from the heat exchanger, releasing the pressure on it and quickly cooling it to check further and undesirable reactions.

10. The process of hydrolyzing titaniferous solutions, which comprises passing a stream of the solution through a heat exchanger of the parallel flow type in which the incoming stream is heated to the hydrolyzing temperature and maintained at such temperature for a predetermined time, and discharging the stream from the heat exchanger and cooling it.

11. The process of hydrolyzing dilute solutions of titanium sulphate to produce a basic titanic sulphate, which comprises continuously passing a stream of the solution through a heat exchanger in which the solution is heated as it enters to the hydrolyzing temperature and maintained at such temperature until the desired degree of hydrolysis has been attained, and then discharging the stream from the heat exchanger and cooling it to check further and undesirable reactions.

12. The process of hydrolyzing dilute solutions of titanium sulphate to produce basic titanic sulphate, which comprises passing a stream of the solution through a tube type hydrolyzer in which the solution is rapidly heated under pressure to the hydrolyzing temperature and maintained under pressure at such temperature until the desired degree of hydrolysis has been attained, and then immediately discharging the stream from the hydrolyzer and quickly cooling it.

13. The process of hydrolyzing dilute solutions of titanium sulphate to produce basic titanic sulphate, which comprises passing a stream of the solution containing excess free sulphuric acid through a tube type hydrolyzer and rapidly heating the stream under pressure as it enters the hydrolyzer to the hydrolyzing temperature and maintaining it at such temperature under pressure as it continues its flow through the hydrolyzer, and then releasing the pressure on the stream and discharging it from the hydrolyzer and quickly cooling it.

14. The process of hydrolyzing titaniferous solutions, which comprises quickly heating under pressure to the hydrolyzing temperature a continuously flowing stream of a solution containing titanium sulphate, particles of an extender pigment and a sufficient excess of free sulphuric acid to prevent the undesirably rapid initial precipitation of basic titanic sulphate which would occur if such excess free acid were not present in the solution, maintaining the stream under pressure at such temperature for the time required to complete the hydrolytic precipitation of basic titanic sulphate upon the extender pigment particles to the desired extent, and then releasing the pressure on the stream and quickly cooling it.

15. The process of hydrolyzing titaniferous solutions, which comprises heating a continuously flowing stream of a solution containing titanium sulphate and particles of an extender pigment to the hydrolyzing temperature, maintaining the stream at such temperature for the time required to complete the hydrolytic precipitation of basic titanic sulphate upon the extender pigment particles to the desired extent, and then cooling the stream.

16. The process of hydrolyzing titaniferous solutions, which comprises substantially instantaneously heating a continuously flowing stream of the solution to the hydrolyzing temperature, maintaining the stream at such temperature for the time required to effect the desired degree of hydrolysis, and then quickly cooling it.

17. The process of hydrolyzing titaniferous solutions, which comprises substantially instantaneously heating under pressure to the hydrolyzing temperature a continuously flowing stream of a solution containing titanium sulphate and a sufficient excess of free sulphuric acid to prevent the undesirably rapid initial precipitation of basic titanic sulphate which would occur if such excess free acid were not present in the solution, maintaining the stream under pressure at such temperature for the time required to complete the hydrolysis to the desired extent, and then releasing the pressure on the stream and quickly cooling it.

18. The process of hydrolyzing titaniferous solutions, which comprises passing a stream of the solution through a tube type heater in which the solution is heated substantially instantaneously to the hydrolyzing temperature and maintained at such temperature for a predetermined time to effect the desired degree of hydrolysis, and then immediately discharging the solution from the heater and cooling it.

19. The process of hydrolyzing dilute solutions of titanium sulphate to produce basic titanic sulphate, which comprises passing a stream of the solution containing excess free sulphuric acid through a tube type hydrolyzer so as to substantially instantaneously heat the stream under pressure as it enters the hydrolyzer to the hydrolyzing temperature and maintaining it at such temperature under pressure as it continues its flow through the hydrolyzer, and then releasing the pressure on the stream and discharging it from the hydrolyzer and quickly cooling it.

BYRAMJI D. SAKLATWALLA.
HOLBERT EARL DUNN.